United States Patent
Speight

(10) Patent No.: US 7,480,261 B2
(45) Date of Patent: Jan. 20, 2009

(54) SYSTEM AND METHOD FOR PHYSICAL SHARED CHANNEL ALLOCATION IN A WIRELESS COMMUNICATION SYSTEM

(75) Inventor: Timothy James Speight, Bristol (GB)

(73) Assignee: Ipwireless, Inc., San Bruno, CA (US)

( * ) Notice: Subject to any disclaimer, the term of this patent is extended or adjusted under 35 U.S.C. 154(b) by 965 days.

(21) Appl. No.: 10/190,300

(22) Filed: Jul. 5, 2002

(65) Prior Publication Data

US 2003/0069020 A1    Apr. 10, 2003

(30) Foreign Application Priority Data

Jul. 6, 2001    (GB)    ................................ 0116557.0

(51) Int. Cl.
*H04Q 7/20* (2006.01)
*H04B 7/00* (2006.01)
*H04J 3/00* (2006.01)

(52) U.S. Cl. ....................... 370/280; 370/336; 370/345; 455/450; 455/509

(58) Field of Classification Search ................. 370/280, 370/336, 345; 455/450, 509
See application file for complete search history.

(56) References Cited

U.S. PATENT DOCUMENTS

| | | | |
|---|---|---|---|
| 6,510,137 B1 * | 1/2003 | Belaiche | 370/232 |
| 6,675,016 B2 * | 1/2004 | Lucidarme et al. | 455/452.2 |
| 6,725,039 B1 * | 4/2004 | Parmar et al. | 455/436 |
| 6,731,623 B2 * | 5/2004 | Lee et al. | 370/349 |
| 6,795,412 B1 * | 9/2004 | Lee | 370/329 |
| 6,850,540 B1 * | 2/2005 | Peisa et al. | 370/468 |
| 6,876,637 B1 * | 4/2005 | Belaiche et al. | 370/329 |
| 6,901,065 B1 * | 5/2005 | Ehrstedt et al. | 370/341 |
| 6,907,248 B2 * | 6/2005 | Lee et al. | 455/450 |
| 6,941,132 B2 * | 9/2005 | Van Lieshout et al. | 455/418 |
| 6,965,579 B1 * | 11/2005 | Shin | 370/312 |
| 6,970,438 B2 * | 11/2005 | Mate et al. | 370/329 |
| 7,068,613 B1 * | 6/2006 | Kwon et al. | 370/278 |
| 7,085,248 B1 * | 8/2006 | Holma et al. | 370/329 |
| 7,088,697 B1 * | 8/2006 | Benz et al. | 370/335 |
| 7,106,705 B1 * | 9/2006 | Mecklenbrauker et al. | 370/329 |

FOREIGN PATENT DOCUMENTS

| | | |
|---|---|---|
| EP | 1001642 A1 | 5/2000 |
| EP | 1009174 A2 | 6/2000 |
| EP | 1104216 A | 5/2001 |
| GB | 2355890 A | 5/2001 |
| GB | 2377343 A | 8/2003 |
| WO | WO-01/17283 A2 | 3/2001 |
| WO | WO-03/005754 A1 | 1/2003 |

* cited by examiner

*Primary Examiner*—Alpus H Hsu
(74) *Attorney, Agent, or Firm*—Morrison & Foerster LLP

(57) ABSTRACT

A system and method for physical shared channel allocation in a UMTS wireless communication system. A physical shared channel allocation message (220) is sent containing a plurality of occurrences of allocated physical resources and TFCS IDs; and, at a radio unit (130A), the sent physical shared channel allocation message is received and the plurality of occurrences of allocated physical resources and TFCS IDs contained therein are processed, thereby allowing a plurality of CCTrCHs to be allocated with a single physical shared channel allocation message (220). This provides the advantage that, using only a limited set of defined transport format combinations, a large portion of the physical resource can be allocated and used by a single UE using a single physical shared channel allocation message.

12 Claims, 2 Drawing Sheets

SYSTEM AND METHOD FOR PHYSICAL SHARED CHANNEL ALLOCATION IN A WIRELESS COMMUNICATION SYSTEM

FIELD OF THE INVENTION

This invention relates generally to wireless communication systems, and particularly (though not exclusively) to wireless communication systems complying with the 3GPP ($3^{rd}$ Generation Partnership Project) standard when shared channels are employed.

BACKGROUND OF THE INVENTION

In the field of this invention it is known that in a 3GPP system the PHYSICAL SHARED CHANNEL ALLOCATION message is used to allocate shared channel physical resources to different units of user equipment (UE) in both uplink and downlink.

A single set of physical resources are defined along with a transport format combination set ID (TFCS ID). The TFCS ID defines a number of transport format combinations (TFC) which are allowed on a coded composite transport channel.

In this way a single coded composite transport channel (CCTrCh) can be allocated using the PHYSICAL SHARED CHANNEL ALLOCATION message.

The PHYSICAL SHARED CHANNEL ALLOCATION message can define separately physical resources and TFCS IDs for both uplink and downlink.

However, this approach has the disadvantage that only a single coded composite transport channel can be allocated (in uplink and downlink) by a single PHYSICAL SHARED CHANNEL ALLOCATION message. This can give rise to either:

1. a large number of PHYSICAL SHARED CHANNEL ALLOCATION messages and consequently significant latency when a large portion of the physical resources is allocated to different users from frame to frame, which is likely to be the case when large proportions of the entire physical resource is set aside to shared channels and packet data applications are used.
2. Very large numbers of transport format combinations having to be signalled which encompass multiple timeslots.

A need therefore exists for a mechanism to permit multiple cctrch allocations from a single physical shared channel allocation message wherein the abovementioned disadvantages may be alleviated.

STATEMENT OF INVENTION

In accordance with a first aspect of the present invention there is provided a wireless communication system employing a physical shared channel allocation message to allocate a radio unit to a shared physical channel, the system comprising: means for sending a physical shared channel allocation message containing a plurality of occurrences of allocated physical resources and transport identifications; and means at the radio unit for receiving the sent physical shared channel allocation message and processing the plurality of occurrences of allocated physical resources and transport identifications contained therein, thereby allowing a plurality of composite transport channels to be allocated with a single physical shared channel allocation message.

In accordance with a second aspect of the present invention there is provided a method for physical shared channel allocation in a wireless communication system to allocate a radio unit to a shared physical channel, the method comprising: sending a physical shared channel allocation message containing a plurality of occurrences of allocated physical resources and transport identifications; and receiving, at the radio unit, the sent physical shared channel allocation message and processing the plurality of occurrences of allocated physical resources and transport identifications contained therein, thereby allowing a plurality of composite transport channels to be allocated with a single physical shared channel allocation message.

In accordance with a third aspect of the present invention there is provided a radio unit for use in a wireless communication system employing a physical shared channel allocation messaging for allocation to a shared physical channel, the radio unit comprising: means for sending a physical shared channel allocation message containing a plurality of occurrences of allocated physical resources and transport identifications, whereby a radio unit receiving the sent physical shared channel allocation message and processing the plurality of occurrences of allocated physical resources and transport identifications contained therein can be allocated to a plurality of composite transport channels with a single physical shared channel allocation message.

In accordance with a fourth aspect of the present invention there is provided a radio unit for use in a wireless communication system employing a physical shared channel allocation messaging for allocation to a shared physical channel, the radio unit comprising: means for receiving a physical shared channel allocation message containing a plurality of occurrences of allocated physical resources and transport identifications, and for processing the plurality of occurrences of allocated physical resources and transport identifications contained in the received message, whereby a plurality of composite transport channels can be allocated with a single physical shared channel allocation message.

BRIEF DESCRIPTION OF THE DRAWINGS

One system and method for permitting multiple CCTrCh allocations from a single physical shared channel allocation message in accordance with the present invention will now be described, by way of example only, with reference to the accompanying drawings, in which.

DESCRIPTION OF PREFERRED EMBODIMENT

Figure 1:
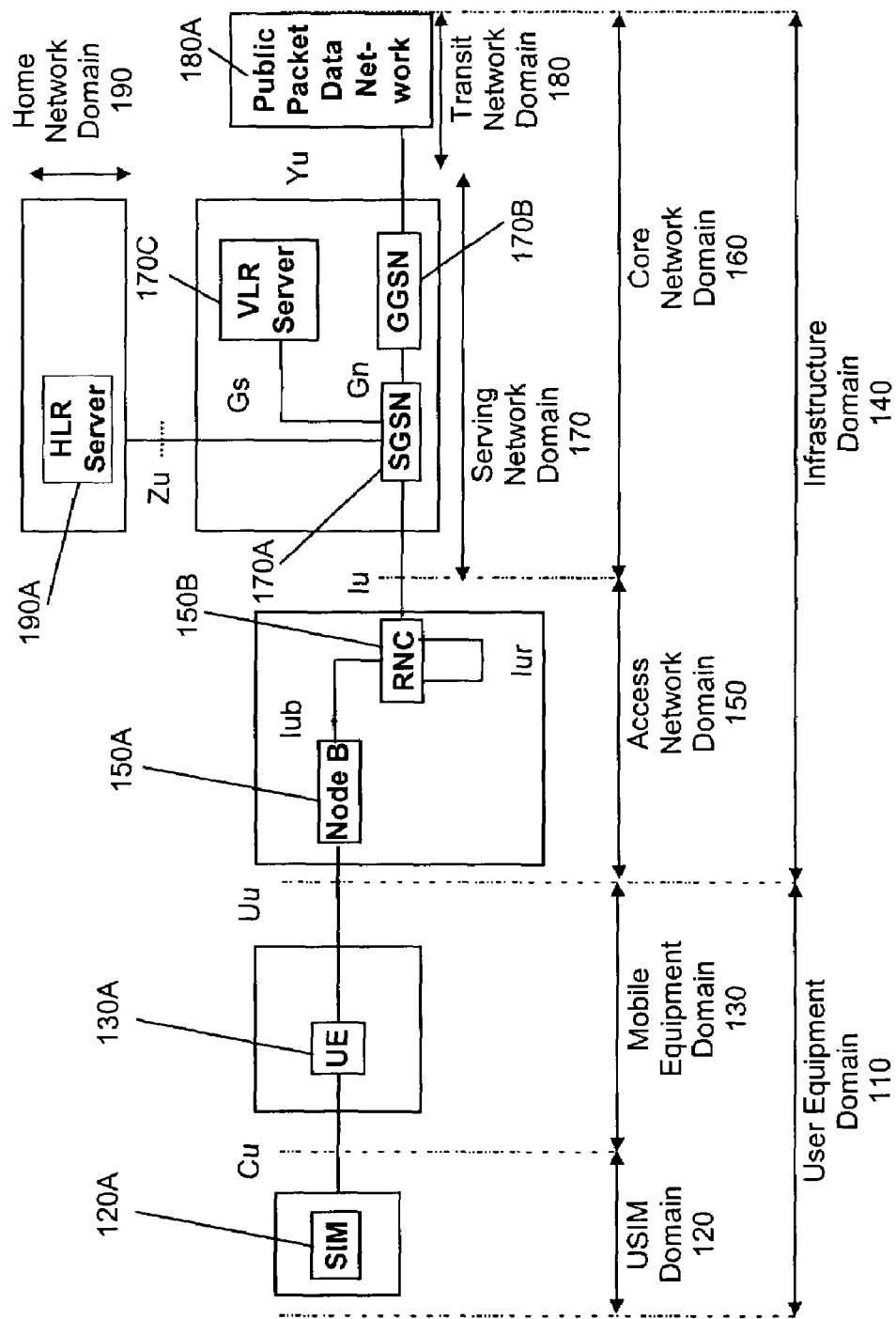
FIG. 1 shows a block diagrammatic representation of a 3GPP system in which the present invention is used.

Referring firstly to FIG. 1, a typical, standard Universal Mobile Telecommuncations System (UMTS) network (100) is conveniently considered as comprising: a user equipment domain (110), made up of a user SIM (USIM) domain (120) and a mobile equipment domain (130); and an infrastructure domain (140), made up of an access network domain (150), and a core network domain (160), which is in turn made up of a serving network domain (170) and a transit network domain (180) and a home network domain (190).

In the mobile equipment domain (130), user equipment UE (130A) receives data from a user SIM (120A) in the USIM domain 120 via the wired Cu interface. The UE (130A) communicates data with a Node B (150A) in the network access domain (150) via the wireless Uu interface. Within the network access domain (150), the Node B (150A) communicates with an RNC (150B) via the Iub interface.

The RNC (150B) commmunicates with other RNC's (not shown) via the Iur interface. The RNC (150B) communicates with a SGSN (170A) in the serving network domain (170) via the Iu interface. Within the serving network domain (170), the SGSN (170A) communicates with a GGSN (170B) via the Gn interface, and the SGSN (170A) communicates with a VLR server (170C) via the Gs interface. The SGSN (170A) communicates with an HLR server (190A) in the home network domain (190) via the Zu interface. The GGSN (170B) communicates with public data network (180A) in the transit network domain (180) via the Yu interface.

Thus, the elements RNC (150B), SGSN (170A) and GGSN (170B) are conventionally provided as discrete and separate units (on their own respective software/hardware platforms) divided across the access network domain (150) and the serving network domain (170), as shown the FIG. 1.

The RNC (150B) is the UMTS Terrestrial Radio Access Network (UTRAN) element responsible for the control and allocation of resources for numerous Node B's (150A); typically 50 to 100 Node B's may be controlled by one RNC. The RNC also provides reliable delivery of user traffic over the air interfaces. RNC's communicate with each other (via the interface Iur) to support handover and macrodiversity.

The SGSN (170A) is the UMTS Core Network element responsible for Session Control and interface to the Location Registers (HLR and VLR). The SGSN is a large centralised controller for many RNCs.

The GGSN (170B) is the UMTS Core Network element responsible for concentrating and tunnelling user data within the core packet network to the ultimate destination (e.g., internet service provider—ISP).

In essence, in a preferred embodiment of the present invention, the PHYSICAL SHARED CHANNEL ALLOCATION message is modified to be able to allocate multiple CCTrCh's. In this way shared channel allocations mirror the way in which DPCHs are allocated in the IE 'downlink DPCH info for each RL' in that multiple CCTrChs can be allocated in a single message.

The PHYSICAL SHARED CHANNEL ALLOCATION message contains a list of physical resources together with transport format combination set IDs for each defined set of physical resources. The length of the list is defined by the known variable 'maxCCTrCh'. Two separate lists of TFCS ID and physical resources are required for uplink and downlink respectively.

When the UE receives the PHYSICAL SHARED CHANNEL ALLOCATION message it goes round this list and defines multiple CCTrChs (upto maxCCTrCh CCTrCh's can be defined).

Figure 2:
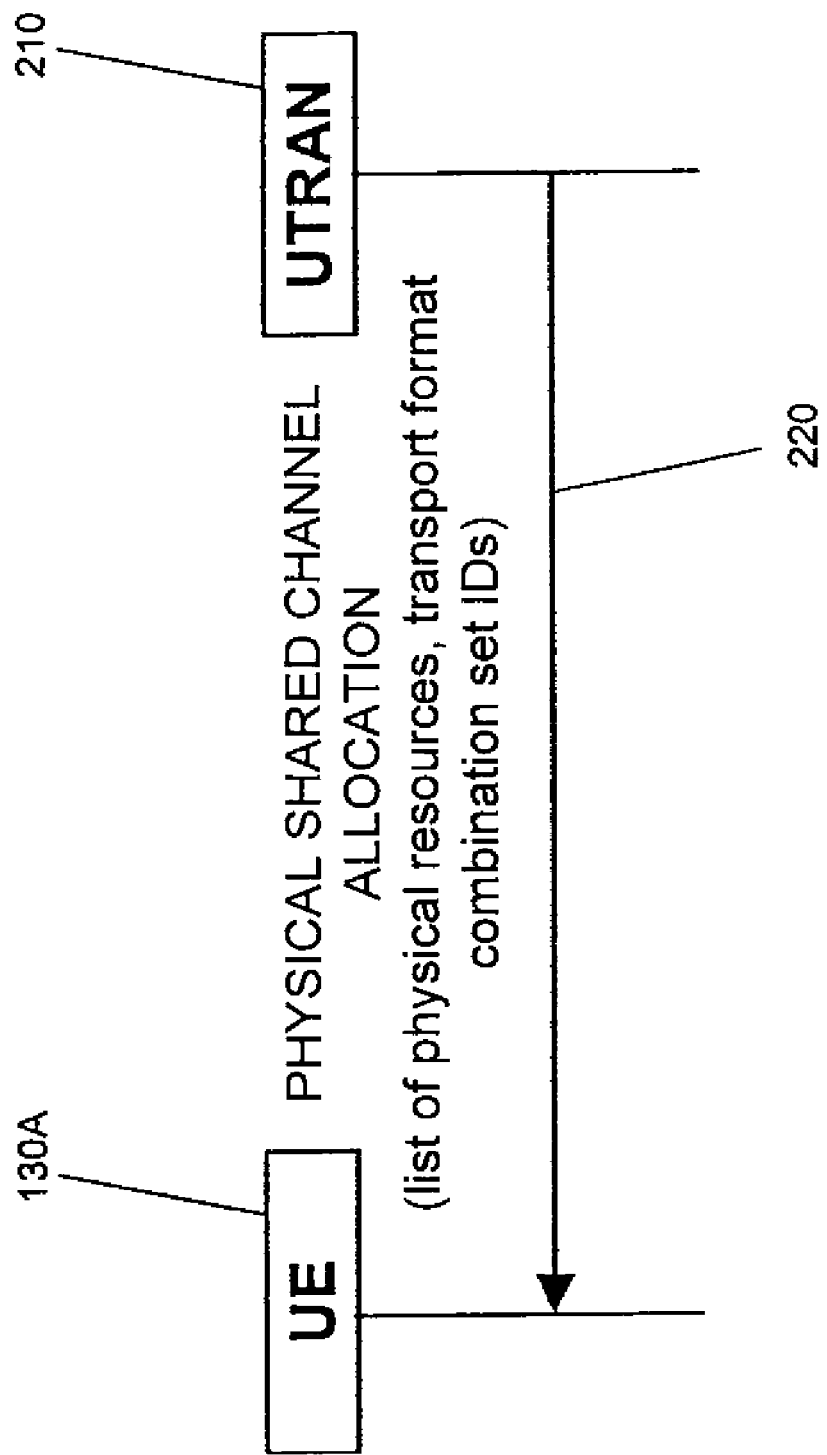
FIG. 2 shows a block schematic diagram illustrating Physical Shared Channel Allocation in the system of FIG. 1.

Referring now also to FIG. 2, the purpose of the procedure shown in the FIG. 2 is to allocate radio resources to USCH (Uplink Shared CHannel) and/or DSCH (Downlink Shared CHannel) transport channels in TDD (Time Division Duplex) mode, for use by a UE. This procedure can also be used to indicate to the UE, that a PUSCH (Physical USCH) allocation is pending, in order to prevent further capacity requests from the UE.

To initiate the Physical Shared Channel Allocation procedure, the UTRAN (210) sends the "PHYSICAL SHARED CHANNEL ALLOCATION" message (220), which contains the list, to the UE (130A).

Upon reception of a "PHYSICAL SHARED CHANNEL ALLOCATION" message, the addressed UE will configure the physical resources used for each downlink CCTrCH given by the IE Information Element) "TFCS ID" in the list according to the following:

if the CHOICE "Configuration" has the value "Old configuration":
      if the UE has stored a PDSCH (Physical DSCH) configuration with the identity given by the IE "PDSCH Identity":
        configure the physical resources according to that configuration;
      otherwise:
        ignore the IE "PDSCH capacity allocation info list";
    if the CHOICE "Configuration" has the value "New configuration":
      configure the physical resources according to the information given in IE "PDSCH Info". If IE "Common timeslot info" or IE "PDSCH timeslots and codes" IE are not present in IE "PDSCH Info":
        reuse the configuration specified in the previous "PHYSICAL SHARED CHANNEL ALLOCATION" message for this CCTrCH;
      if the IE "PDSCH Identity" is included:
        store the new configuration using that identity;
    start using the new configuration at the CFN specified by the IE "Allocation activation time", and use that for the duration given by the IE "Allocation duration";
    if the IE "Confirm request" has the value "Confirm PDSCH" and IE "PDSCH Identity" is included in IE "PDSCH capacity allocation info list":
    initiate the known PUSCH CAPACITY REQUEST procedure
  if the IE "PUSCH capacity allocation info list" is included:
  stop the known timer T310, if running;
  if the CHOICE "PUSCH allocation" has the value "PUSCH allocation pending":
    start the known timer T311;
  if the CHOICE "PUSCH allocation" has the value "PUSCH allocation assignment":
    stop the known timer T311, if running;
    configure the physical resources used for each uplink CCTrCH given by the IE "TFCS ID" in the list according to the following:
      if the CHOICE "Configuration" has the value "Old configuration":
        if the UE has stored a PUSCH configuration with the identity given by the IE "PUSCH Identity":
          configure the physical resources according to that configuration;
        otherwise:
          ignore the IE "PUSCH capacity allocation info list";
      if the CHOICE "Configuration" has the value "New configuration", the UE will:
        configure the physical resources according to the information given in IE "PUSCH Info". If IE "Common timeslot info" or IE "PUSCH timeslots and codes" is not present in IE "PUSCH Info":
          reuse the configuration specified in the previous "PHYSICAL SHARED CHANNEL ALLOCATION" message for this CCTrCH.
      if the IE "PUSCH Identity" is included:
        store the new configuration using that identity;
  start using the new configuration at the CFN specified by the IE "Allocation activation time", and use that for the duration given by the IE "Allocation duration";
  if the IE "Traffic volume report request" is included:

initiate the known PUSCH CAPACITY REQUEST procedure at the time indicated by the IE "Traffic volume report request";

if the IE "Confirm request" has the value "Confirm PUSCH" and IE "PUSCH Identity" is included in IE "PUSCH capacity allocation info list":

initiate the known PUSCH CAPACITY REQUEST procedure.

determine the TFCS subset and hence the TFCI values which are possible given the PUSCH allocation for that CCTrCH;

configure the MAC (Medium Access Control) in the UE with this TFCS restriction if necessary;

transmit USCH Transport Block Sets as required, within the TFCS limits given by the PUSCH allocation.

Finally, the UE will:

clear the entry for the PHYSICAL SHARED CHANNEL ALLOCATION message in the table "Accepted transactions" in the variable TRANSACTIONS;

and the procedure ends.

It will be appreciated that the mechanism described above will typically be implemented by adapting or reprogramming one or more processors in the UE or Node B. As such the required adaptation may be implemented in the form of processor-implementable instructions stored on a storage medium, such as a fixed or removable magnetic or optical disk, PROM, RAM or any combination of these or other storage media.

It will be understood that the mechanism for permitting multiple CCTrCh allocations from a single physical shared channel allocation message described above provides the advantage that, using only a limited set of defined transport format combinations, a large portion of the physical resource can be allocated and used by a single UE using a single PHYSICAL SHARED CHANNEL ALLOCATION message.

The invention claimed is:

1. A wireless communication system using a physical shared channel allocation message to allocate shared physical channel resources to a radio unit, the system comprising:

means for sending a physical shared channel allocation message to a radio unit, the message containing a plurality of sets of indicators for allocated physical resources and an associated set of transport format identifications for each of the sets of indicators for allocated physical resources, wherein the physical shared channel allocation message relates to Time Division Duplex (TDD) mode; and means at the radio unit for receiving the sent physical shared channel allocation message, and for processing the plurality of sets of indicators for allocated physical resources and the associated transport format identifications contained therein, thereby allowing a plurality of composite transport channels to be allocated with a single physical shared channel allocation message.

2. The wireless communication system as claimed in claim 1 wherein the number of composite transport channels allocated by the physical shared channel allocation message is equal to the maximum allowed number of composite transport channels allowed in the system.

3. The wireless communication system as claimed in claim 1 wherein the system is a Universal Mobile Telecommunications System (UMTS) system, each set of transport format identifications form a transport format combination set, and the composite transport channels are coded composite transport channels.

4. A method for physical shared channel allocation in a wireless communication system to allocate shared physical channel resources to a radio unit, the method comprising:

sending a physical shared channel allocation message containing a plurality of sets of indicators for allocated physical resources and an associated set of transport format identifications for each of the sets of indicators for allocated physical resources, wherein the physical shared channel allocation message relates to Time Division Duplex (TDD) mode, and the physical shared channel allocation message indicates a plurality of composite transport channels to be allocated to the receiving radio based upon processing of the physical shared channel allocation message by the receiving radio.

5. The method for physical shared channel allocation as claimed in claim 4 wherein the number of composite transport channels allocated by the physical shared channel allocation message is equal to the maximum allowed number of composite transport channels allowed in the system.

6. The method for physical shared channel allocation as claimed in claim 4 wherein the system is a Universal Mobile Telecommunications System (UMTS) system, each set of transport format identifications form a transport format combination set, and the composite transport channels are coded composite transport channels.

7. A wireless communication system using physical shared channel allocation messaging for allocation of a shared physical channel, the wireless communication system unit comprising:

means for sending a physical shared channel allocation message containing a plurality of sets of indicators for allocated physical resources and an associated set of transport format identifications for each of the sets of indicators for allocated physical resources, wherein the physical shared channel allocation message relates to Time Division Duplex (TDD) mode, and the physical shared channel allocation message indicates a plurality of composite transport channels to be allocated to the receiving radio based upon urocessing of the physical shared channel allocation message by the receiving radio.

8. The wireless communication system as claimed in claim 7, wherein the number of composite transport channels allocated by the physical shared channel allocation message is equal to the maximum allowed number of composite transport channels allowed in the system.

9. The wireless communication system as claimed in claim 7 wherein the system is a Universal Mobile Telecommunications System (UMTS) system, each set of transport format identifications form a transport format combination set, and the composite transport channels are coded composite transport channels.

10. A radio unit for use in a wireless communication system employing physical shared channel allocation messaging for allocation to a shared physical channel, the radio unit comprising:

means for receiving a physical shared channel allocation message containing a plurality of sets of indicators for allocated physical resources and an associated set of transport format identifications for each of the sets of indicators for allocated physical resources, wherein the physical shared channel allocation message relates to Time Division Duplex (TDD) mode; and means for processing the plurality of sets of indicators for allocated physical resources and associated sets of indicators for transport format identifications contained in the received message, whereby a plurality of composite transport channels can be allocated with a single physical shared channel allocation message.

11. A computer readable medium encoded with computer program instructions for performing a process, the computer program instructions comprising instructions for:

receiving, at a radio unit, a sent physical shared channel allocation message, the message comprising a plurality of sets of indicators for allocated physical resources, and an associated set of transport format identifications for each of the sets of indicators for allocated physical resources, wherein the physical shared channel allocation message relates to Time Division Duplex (TDD) mode; and processing the plurality of sets of indicators for allocated physical resources and the associated sets of indicators for transport format identifications contained therein, thereby allowing a plurality of composite transport channels to be allocated with a single physical shared channel allocation message.

12. A computer readable medium encoded with computer program instructions, the computer program instructions comprising instructions for:

sending a physical shared channel allocation message containing a plurality of sets of indicators for allocated physical resources and an associated set of transport format identifications for each of the sets of indicators for allocated physical resources, wherein the physical shared channel allocation message relates to Time Division Duplex (TDD) mode, and the physical shared channel allocation message indicates a plurality of composite transport channels to be allocated to the receiving radio based upon processing of the physical shared channel allocation message by the receiving radio.

* * * * *